(12) United States Patent
Thugutt

(10) Patent No.: US 11,635,018 B2
(45) Date of Patent: Apr. 25, 2023

(54) INTERNAL COMBUSTION ENGINE AND METHOD FOR OPERATING AN INTERNAL COMBUSTION ENGINE

(71) Applicant: Felix Thugutt, Saarbrücken (DE)

(72) Inventor: Felix Thugutt, Saarbrücken (DE)

( * ) Notice: Subject to any disclaimer, the term of this patent is extended or adjusted under 35 U.S.C. 154(b) by 0 days.

(21) Appl. No.: 17/490,376

(22) Filed: Sep. 30, 2021

(65) Prior Publication Data

US 2022/0112837 A1  Apr. 14, 2022

(30) Foreign Application Priority Data

Oct. 13, 2020 (DE) ..................... 10 2020 126 864.5

(51) Int. Cl.
| | |
|---|---|
| *F02B 53/02* | (2006.01) |
| *F02B 53/12* | (2006.01) |
| *F02B 55/02* | (2006.01) |
| *F01C 3/06* | (2006.01) |
| *F02B 55/14* | (2006.01) |
| *F02B 53/04* | (2006.01) |
| *F02B 53/10* | (2006.01) |
| *F02B 53/06* | (2006.01) |

(52) U.S. Cl.
CPC ................ *F02B 53/02* (2013.01); *F01C 3/06* (2013.01); *F02B 53/04* (2013.01); *F02B 53/06* (2013.01); *F02B 53/10* (2013.01); *F02B 53/12* (2013.01); *F02B 55/02* (2013.01); *F02B 55/14* (2013.01)

(58) Field of Classification Search
CPC .......... F02B 53/02; F02B 53/04; F02B 53/06; F02B 53/10; F02B 53/12; F02B 55/02; F02B 55/14; F01C 3/06
See application file for complete search history.

(56) References Cited

U.S. PATENT DOCUMENTS

| | | |
|---|---|---|
| 5,352,295 A | 10/1994 | Chou |
| 2019/0242259 A1* | 8/2019 | Bonin ..................... F01C 20/14 |

FOREIGN PATENT DOCUMENTS

| | | | |
|---|---|---|---|
| CN | 107084042 A | 8/2017 | |
| DE | 3533896 A1 | 3/1987 | |
| DE | 3724298 A1 | 2/1988 | |
| DE | 19538171 A1 * | 4/1997 | ............ F01C 1/3562 |
| DE | 19954480 A1 * | 5/2001 | ............ F01C 11/004 |
| GB | 2195145 B | 3/1991 | |

* cited by examiner

*Primary Examiner* — Audrey B. Walter
(74) *Attorney, Agent, or Firm* — Lucas & Mercanti, LLP; Klaus P. Stoffel

(57) ABSTRACT

An internal combustion engine for producing mechanical drive power by combustion of a fuel. The internal combustion engine includes two or three rotary pistons which are rotationally fixedly connected to an output shaft and rotatably arranged in a respective annular cylinder, and at least one passage between the annular cylinders and a respective movable shut-off slide valve for periodically closing the cylinders adjacent to the passage.

13 Claims, 13 Drawing Sheets

INTERNAL COMBUSTION ENGINE AND METHOD FOR OPERATING AN INTERNAL COMBUSTION ENGINE

CROSS-REFERENCE TO RELATED APPLICATIONS

The present application claims priority of DE 10 2020 126 864.5, filed Oct. 13, 2020, the priority of this application is hereby claimed, and this application is incorporated herein by reference.

BACKGROUND OF THE INVENTION

The invention concerns an internal combustion engine and a method for operating an internal combustion engine.

Internal combustion engines for producing mechanical drive power by combustion of a fuel are known by common use. With the addition of combustion air, the energy chemically bonded into the fuel is converted into heat, whereby the substances expand in a combustion chamber and the pressure (present there) rises. Because of the oscillating masses, in particular the pistons and valves, such internal combustion engines have however a tendency to vibrate, which constitutes an additional load on the components. The additionally required, particularly stable mounting of the moving parts also increases the weight. In rotary piston engines such as the Wankel engine, the vibration tendency is indeed reduced but, because of the unfavorable design of the piston head and the resulting short lever arm, only a comparatively low torque is achieved.

SUMMARY OF THE INVENTION

It is an object of the invention to produce an internal combustion engine which allows a particularly simple and lightweight construction and also has a high running smoothness and high torque.

This object is achieved in that the internal combustion engine has two rotary pistons which are rotationally fixedly connected to an output shaft and are rotatably arranged in a respective annular cylinder, at least one passage between the annular cylinders and a respective shut-off slide valve for periodically closing the cylinders adjacent to the passage. The arrangement between the annular cylinders also means embodiments in which the passage is arranged e.g. radially offset towards the outside, and in some cases opens at the radial end faces into the cylinders, wherein the passage thus lies arbitrarily in a plane between the annular cylinders and/or is formed above the cylinders. The rotary pistons, which can rotate on a circular track in the annular cylinders, ensure a particularly high running smoothness. The two cylinders can be periodically closed by means of the shut-off slide valves so that the rotary piston compresses the air present in the cylinders, or a pressurized combustion gas present in a cylinder can perform work at the rotary piston concerned.

The rotary pistons need not be attached to an output shaft or piston disc. Separate cylinders with separate piston discs may be provided, which are each connected to output shafts (shaft halves) which may be oriented differently. The rotary pistons may for example be connected close to a combustion chamber via a gear mechanism, for example bevel gears, wherein the rotational axes of the pistons may have a deviation of for example 1°. Alternatively or additionally, a cylinder/piston half may be rotated through 180° and thus run in the opposite direction to the other half, where applicable with a re-oriented valve disc.

Alternatively, the internal combustion engine may also have three or more rotary pistons which are rotationally fixedly connected to an output shaft and are rotatably mounted in a respective annular cylinder. As in the variant with two rotary pistons, the cylinders may be arranged close to one another such that a common cylinder casing may be provided. "Rotationally fixedly" means that the movement of the rotary pistons relative to one another is defined, either as an identical movement for example via a substance-bonded connection, or as a defined relative movement via the intermediate gear mechanism.

Preferably, the passage between the cylinders may be configured as a combustion chamber, in particular with an ignition device for the fuel such as a spark plug or glow plug, and/or a direct injection device for the fuel. Alternatively, the ignition device for the fuel and/or the direct injection device for the fuel may be arranged in the working cylinder. Depending on application, the ignition and combustion may accordingly take place in the combustion chamber and/or the working cylinder. To summarize, the fuel supply may thus be premixed with the supplied air according to the Otto principle, or take place by means of direct injection and controlled ignition via spark plugs, or using the diesel principle by means of injection of the fuel via direct injection and auto-ignition. As well as air-fuel mixtures, gas mixtures may also be used such as for example a hydrogen-oxygen mixture or mixtures comprising organic gases.

In a preferred embodiment, a first rotary piston may be configured as a compression piston in a compression cylinder, and a second rotary piston configured as a working piston in a working cylinder, wherein the rotary pistons are arranged offset to one another in the rotational direction. In this way, fresh gas can be compressed by the compression piston in the compression cylinder and pushed either directly through the passage into the working cylinder or into the combustion chamber. The hot gas may then escape into the working cylinder and perform work at the working piston.

Preferably, the working piston is arranged offset in front of the compression piston in the rotational direction. This allows the working piston to close a combustion chamber outlet to the working cylinder while the compression piston pushes fresh gas into the combustion chamber and compresses it there. Furthermore, the offset of the pistons allows the compression piston to close the combustion chamber inlet while the expanding gas performs work at the working piston. Advantageously, at least one of the rotary pistons may extend over more than 180° in the rotational direction.

To ensure a particularly good compression of the fresh gas in the compression cylinder, a shut-off slide valve may be arranged in the compression cylinder behind the passage or combustion chamber in the rotational direction of the compression piston, so that the air to be compressed cannot escape and is pushed into the passage or combustion chamber. Also, a shut-off slide valve may be arranged in the working cylinder in front of the passage or combustion chamber in the rotational direction of the working piston, so that the expanding combustion gas cannot escape and transfers energy to the working piston.

Particularly preferably, the shut-off slide valves may be arranged on rotatably mounted valve discs. By rotation of the valve discs, one or more shut-off slide valves can be briefly pushed into the respective cylinder in order to close this. Advantageously, at least one shut-off slide valve of the compression cylinder and at least one shut-off slide valve of the working cylinder may be arranged on a respective valve disc, i.e. for example one valve disc with a shut-off slide valve for the compression cylinder and one valve disc with a shut-off slide valve for the working cylinder. In an advantageous embodiment, several shut-off slide valves of the compression cylinder and/or the working cylinder may be provided, which may be arranged on a common valve disc for the compression cylinder or working cylinder, and for example be synchronized with the compression piston/working piston via a gear mechanism and different rotational speeds. The embodiment with several shut-off slide valves per valve disc is more balanced, while the embodiment with one shut-off slide valve for two pistons per cylinder must rotate faster, so that the piston fronts and piston rears are less acute/steep, which results in better force vectors.

Preferably, the rotational axes of the valve discs are arranged offset and/or at an angle to the annular cylinders such that on a rotation of the valve discs, the shut-off slide valves periodically cross the cylinders and in so doing close these unilaterally or completely. For this, preferably, a corresponding slot is provided in the housing of the cylinders. The rotating valve disc reduces the number of oscillating components, which increases running smoothness.

Advantageously, the rotary pistons may have an angular, in particular rectangular or triangular cross-section with preferably rounded corners, or also a rounded cross-section. Furthermore advantageously, the rotary pistons may be arranged together on a piston disc at respective opposite end faces adjacent to an outer edge. Also, the in particular angular rotary pistons may be arranged sloping towards one another in the radial direction, i.e. have an angle to the perpendicular on the rotational axis of the pistons.

In a further preferred embodiment, the compression piston may have a reducing cross-section against the rotational direction, and/or the working piston may have a reducing cross-section in the rotational direction, in particular with stepless or stepped reduction in cross-section. In this way, the cycles of intake, compression, expansion and expulsion may be matched to one another efficiently, whereby a particularly compact and lightweight construction and hence a high power density can be achieved. In particular with the working piston, the reducing cross-section has the advantage that it gives more space for expansion of the ignited gases and hence theoretically more space and time for completing the reaction/combustion. This is especially advantageous with particularly compact embodiments, where comparatively little space is available. The concrete design of the cross-sectional reduction also offers degrees of freedom in optimization, and an optimal adaptation to the respective requirements is possible. Furthermore advantageously, the front and rear end faces of the pistons may have a cross-section which reduces towards the ends, in particular with a stepless reduction in cross-section, whereby a minimum possible gap size to the shut-off slide valves can be achieved.

In order to allow a supply of fresh gas and the discharge of exhaust gas, in the rotational direction of the rotary pistons, an inlet opening for the fresh gas may be arranged on the compression cylinder behind the shut-off slide valve, and an outlet opening for the combustion gases may be arranged on the working cylinder in front of the shut-off slide valve.

A method is also claimed for operating an internal combustion engine, in particular an internal combustion engine as described above. According to the invention, a compression cylinder is closed by means of a shut-off slide valve behind a passage to a working cylinder in the rotational direction of the compression piston, and also the passage in the working cylinder is closed by a working piston. The phrase "behind a passage" means that the shut-off slide valve closes the compression cylinder behind the outlet opening of the passage in the compression cylinder. Then fresh gas in the compression cylinder is compressed between the compression piston and the shut-off slide valve and/or in the passage by movement of the compression cylinder, until the passage from the compression cylinder is closed by the compression cylinder. Fuel is added or has already been added to the compressed fresh gas, and the mixture is ignited then at the latest, so that the temperature and pressure in the passage rise. Then, or shortly before, the working piston opens the passage to the working cylinder and the pressurized combustion gas can expand, driving the working piston. Alternatively, the mixture may be ignited only after opening of the passage by the working piston.

In an embodiment with short rotary pistons, in particular a rotary piston which spans an angular range of less than 180°, a separate valve may be provided, in particular a hydraulic slide valve, which can briefly take over the task of closing the passage in the case of low-pressure conditions in cylinders.

Advantageously, before expansion of the heated gases or before introduction of the compressed gases into the working cylinder, the working cylinder may be closed by means of a shut-off slide valve in front of the passage or an opening into the passage in the rotational direction of the working piston. In this way, it is guaranteed that the entire theoretically available pressure is available at the working cylinder.

Particularly advantageously, periodically the passage may be closed by the compression piston and the working piston simultaneously.

In an advantageous embodiment, the compressed fresh gas may be introduced into the working cylinder before ignition and before the compression piston closes the passage.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
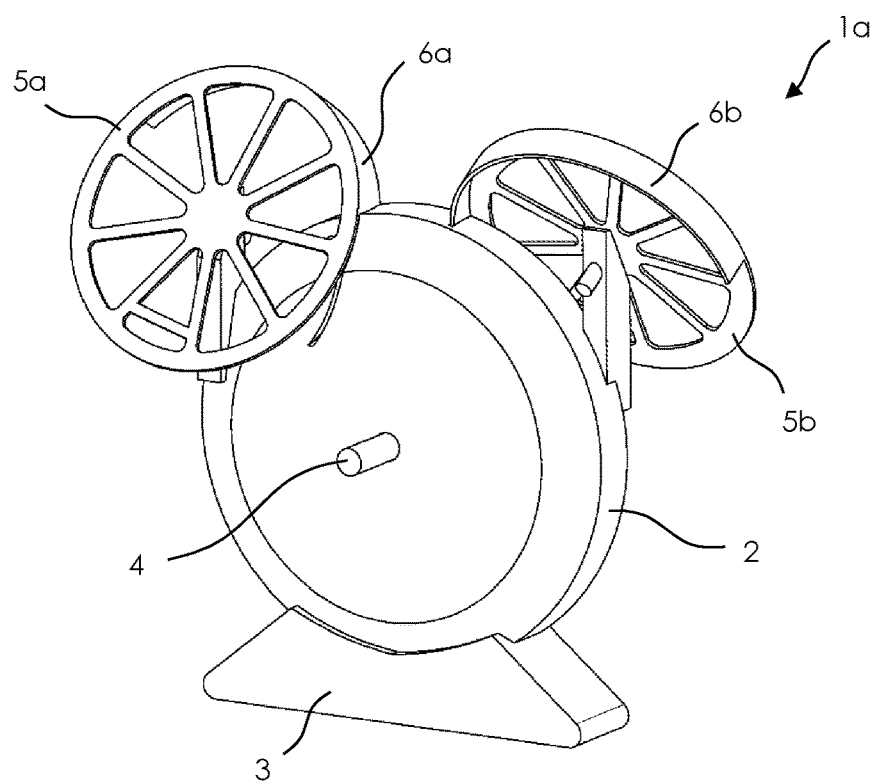
FIG. 1 a perspective illustration of an internal combustion engine.

FIG. 1 shows a perspective illustration of an internal combustion engine 1*a*. The internal combustion engine 1*a* comprises a housing 2 which is supported via a support 3 on a base (not shown). An output shaft 4, from which the power of the internal combustion engine 1*a* can be taken, for example to operate an electric generator or a vehicle, protrudes laterally from the housing 2.

Two valve discs 5*a*, 5*b* are rotatably mounted on protruding webs of the housing 2. The valve discs 5*a*, 5*b* are oriented relative to the housing 2 such that, on rotation about the respective rotational axis of the valve disc 5*a*, 5*b*, shut-off slide valves 6*a*, 6*b* arranged on the valve discs 5*a*, 5*b* periodically protrude into slots in the housing 2. The shut-off slide valves 6*a*, 6*b* protrude perpendicularly from the otherwise flat valve discs 5*a*, 5*b*, and at the outer edge are formed as a ring web of constant radius extending over part of the circumference. The slots are formed correspondingly to this such that the shut-off slide valves 6*a*, 6*b* can protrude or dip into the housing 2 with the minimum possible gap.

The rotational movement of the valve discs 5*a*, 5*b* is connected to the rotational movement of the output shaft 4 via transmission means (not shown), such as for example a toothed gear mechanism or at least one belt, so that the rotational movements are synchronized.

Figure 2:
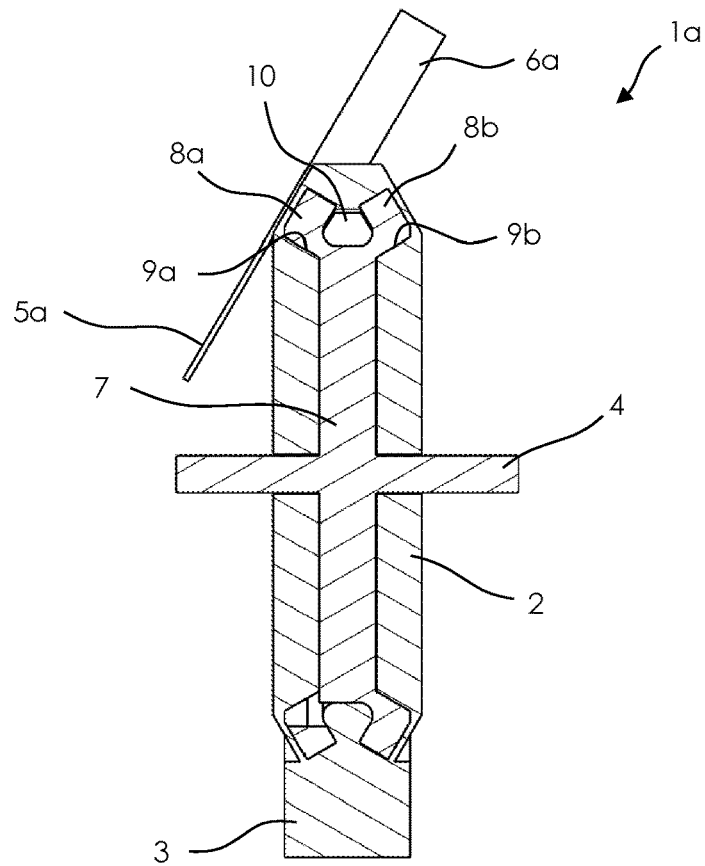
FIG. 2 a cross-section through the internal combustion engine from FIG. 1.

FIG. 2 shows a cross-section through the internal combustion engine 1*a* from FIG. 1. The cross-section is oriented vertically, and the rotational axis of the output shaft 4 lies in the drawing plane. As evident from the illustration, the output shaft 4 is rotatably fixedly connected to the rotary pistons 8*a*, 8*b* via a piston disc 7. The rotary pistons 8*a*, 8*b* are arranged in annular cylinders 9*a*, 9*b*. Because of the rotary mounting of the output shaft 4, the rotary pistons 8*a*, 8*b* are positioned precisely relative to the annular cylinders 9*a*, 9*b*, such that particularly small gap sizes can be achieved with a good sealing effect between the rotary pistons 8*a*, 8*b* and the annular cylinders 9*a*, 9*b*. In addition, further sealing elements may be provided, such as for example piston rings on the rotary pistons 8*a*, 8*b* or slide seals in the annular cylinders 9*a*, 9*b*. The rotary pistons 8*a*, 8*b* can rotate freely about the rotational axis of the output shaft 4 through the annular cylinders 9*a*, 9*b*, which are designed similarly to a torus but with rectangular cross-section.

In an upper region shown in the drawing, a passage 10 is arranged between the annular cylinders 9*a*, 9*b* which opens into the respective annular cylinders 9*a*, 9*b*. The passage 10 allows the flow of gases between the annular cylinders 9*a*, 9*b*. Viewed in the rotational direction of the rotary pistons 8*a*, 8*b*, the passage 10 is restricted to a specific angular region so that a flow of gases between the annular cylinders 9*a*, 9*b* is otherwise prevented. Alternatively, at least two passages could be provided which are formed separately and offset to one another for example by 1 mm in the rotational direction of the rotary pistons.

Figure 3:
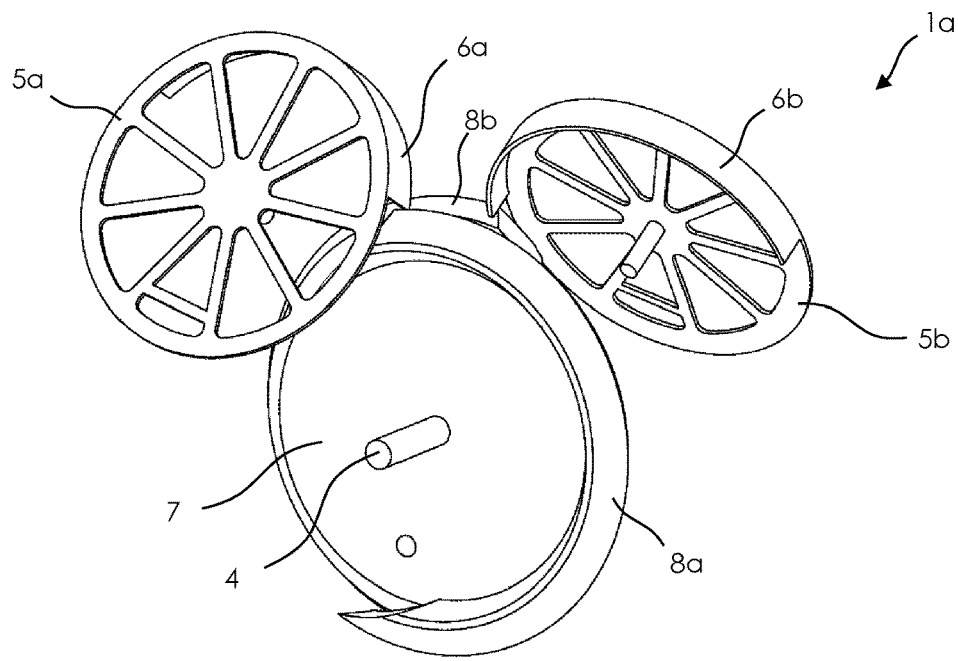
FIG. 3 a detail view of the internal combustion engine from FIG. 1 without housing.

FIG. 3 shows a detail view of the internal combustion engine from FIG. 1 without the housing 2 but with the support 3. As evident there, the rotary pistons 8*a*, 8*b* extend over an angular range of more than 120°, in particular more than 180°, in the rotational direction of the output shaft 4. In an upper region, it is evident that the rotary pistons 8*a*, 8*b* overlap in an angular region.

In the embodiment shown, the rotational directions of the output shaft 4, valve disc 5*a* and valve disc 5*b* run clockwise. The synchronization of the valve discs 5*a*, 5*b* with the output shaft 4 ensures that no collision occurs between the shut-off slide valves 6*a*, 6*b* and the rotary pistons 8*a*, 8*b*. As evident from the arrangement shown, because of the rotation of the valve disc 5*b*, the shut-off slide valve 6*b* arranged thereon is withdrawn from the annular cylinder 9*b* (not shown) when the rotary piston 8*b* approaches. The mutual synchronization may be set such that the end of the shut-off slide valve 6*b* slides along the (shown) flattened end face of the rotary piston 8*b* and lies in a sealing fashion thereon. As further evident from the illustration, the shut-off slide valve 6*a* on the valve disc 5*a* moves back into the annular cylinder 9*a* when the rotary piston 8*a* moves away. For this, the rear of the rotary piston 8*a* is flattened so that the front end of the shut-off slide valve 6*a* can slide along the flattened end of the rotary piston 8*a* and lie in a sealing fashion thereon. Because of the described synchronization and the design of the rotary pistons 8*a*, 8*b* and the shut-off slide valves 6*a*, 6*b*, it is guaranteed that the annular cylinders 9*a*, 9*b* are closed by the shut-off slide valves 6*a*, 6*b*, but on each revolution of the rotary pistons 8*a*, 8*b*, the annular cylinders 9*a*, 9*b* are briefly opened in order to prevent a collision with the rotary pistons 8*a*, 8*b*.

FIGS. 4*a*-4*e* show various working steps of the internal combustion engine 1*a* from FIG. 1 in a side view. The illustration on the left here corresponds to the side view onto the rotary piston 8*a*, and that on the right corresponds to the side view onto the opposite rotary piston 8*b*. For simplification however, the two views are shown in the same direction of observation, and the other elements are concealed accordingly so as to better clarify the mutual positioning of the rotary pistons for the identical rotational direction. Also, only the annular cylinders 9*a*, 9*b* with rotary pistons 8*a*, 8*b* arranged therein and the shut-off slide valves 6*a*, 6*b* are shown. The shut-off slide valves 6*a*, 6*b* cross the annular cylinders 9*a*, 9*b* at a point in an upper region adjacent to a passage 10, and are otherwise spaced therefrom. The passage 10 may be configured as a combustion chamber, in particular with the ignition device for the fuel.

In the exemplary embodiment shown in FIGS. 4*a*-4*e*, the rotary piston 8*b* is formed as the compression piston and the rotary piston 8*a* as the working piston. Accordingly, the annular cylinder 9*b* is a compression cylinder and the annular cylinder 9*a* is a working cylinder. As furthermore evident from the illustration, the compression piston 8*b* and the working piston 8*a* are arranged offset to one another in the rotational direction, wherein the compression piston 8*b* is in front of the working piston 8*a* in the rotational direction. In the top view of FIGS. 4*a*-4*e*, the rotational direction of the working piston 8*a* and the compression piston 8*b* runs clockwise. The rotational direction of the shut-off slide valves 6*a*, 6*b* is also clockwise.

Figure 4A:
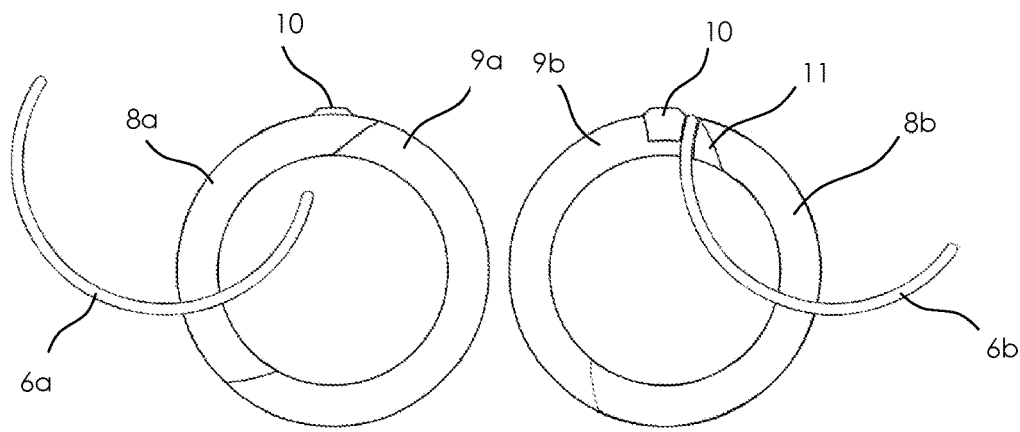
FIG. 4*a*-4*e* various working steps of the internal combustion engine from FIG. 1 in a side view.

In the working step shown in FIG. 4*a*, the passage 10 is closed by the working piston 8*a* so that no air can flow from the compression cylinder 9*b* into the working cylinder 9*a*. The shut-off slide valve 6*a* does not stand in front of the working piston 8*a*. As evident from the top view of the compression piston 8*b*, a first end of the shut-off slide valve 6*b* protrudes into the compression cylinder 9*b* and closes this so that no gas can flow past the shut-off slide valve 6*b* from the one half into the other half of the compression cylinder 9b. This working step is the start of the compression stroke, in which gas present in the annular cylinder 9b in front of the passage 10 in the rotational direction of the compression piston 8b is pushed by the compression piston 8b in the direction of the passage 10. The shut-off slide valve 6b, which is arranged behind the passage 10 in the rotational direction of the compression piston 8b, guarantees that the compressed air is pressed in the direction of the passage 10. Since however the passage 10 is closed on the opposite side by the working piston 8a, the air is compressed. As well as compression of the air, the intake of fresh gas also begins in this working step. For this, on a side of the shut-off slide valve 6b opposite the passage 10, an inlet opening 11 is provided through which the compression piston 8b draws in fresh gas.

Figure 4B:
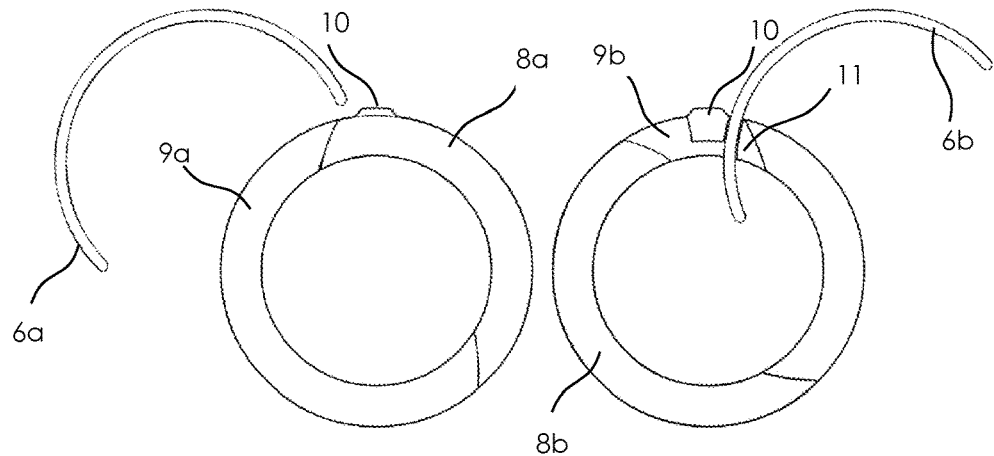

FIG. 4b shows a working step which follows the working step shown in FIG. 4a. The rotary pistons 8a, 8b and the shut-off slide valves 6a, 6b are moved in their rotational direction. As evident from the top view of the working piston 8a, this continues to close the passage 10 so that the air, which is further compressed in the compression cylinder 9b, cannot yet flow through the passage 10 into the working cylinder 9a. It is evident from the top view of the compression piston 8b that the space between the end face of the compression piston 8b and the shut-off slide valve 6b has been significantly reduced, which leads to a pressure rise in the region of the passage 10. On the side opposite the shut-off slide valve 6b, the available space in the compression cylinder 9b is significantly increased, so that further fresh gas can be drawn in from the inlet opening 11. This working step takes place shortly before the opening of the passage by the working piston 8a and the highest pressures are achieved.

Figure 4C:
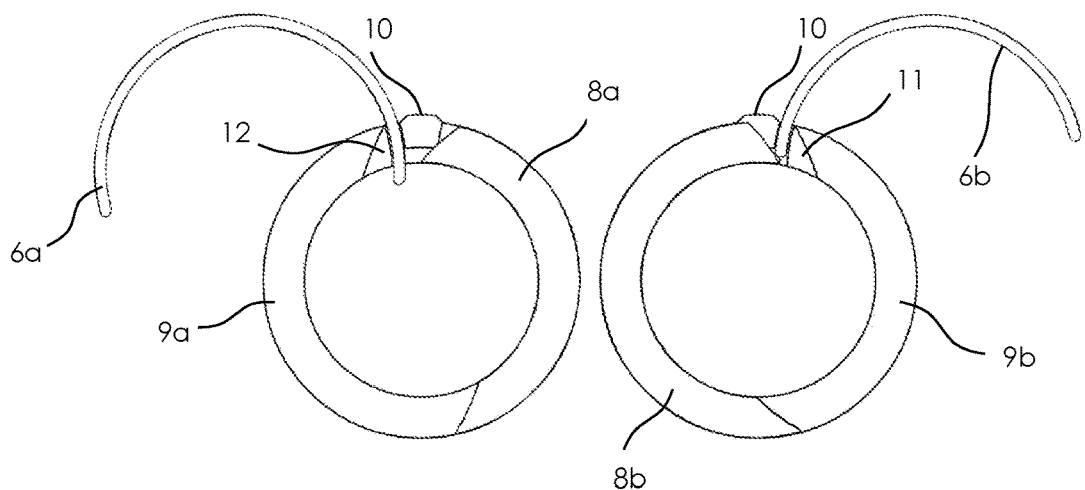

FIG. 4c shows a working step which follows the working step shown in FIG. 4b. Here, the passage 10 is now no longer closed by the working piston 8a, so that the compressed air in the compression cylinder 9b and the passage 10 can flow into the working cylinder 9a. Because of the rotation, the shut-off slide valve 6a now protrudes into the working cylinder 9a and closes this, so that the compressed air from the passage 10 can only move in the direction of the working piston 8a and push this in the rotational direction. As furthermore evident from the top view of the working piston 8a, the shut-off slide valve 6a is positioned in the working cylinder 9a in front of the passage 10 in the rotational direction of the working piston 8a. On a side of the shut-off slide valve 6a opposite the passage 10, an outlet opening 12 is arranged, through which gases in the working cylinder 9a from a preceding cycle can be expelled. As evident from the top view of the compression piston 8b, in this position, the compression piston 8b already is partially closing the passage 10 and the shut-off slide valve 6b is just opening the compression cylinder 9b, wherein the shut-off slide valve 6b slides in a sealing fashion along the end face of the compression piston 8b. Thus the remaining gas is pushed out of the compression cylinder 9b into the passage 10 and into the working cylinder 9a.

Figure 4D:
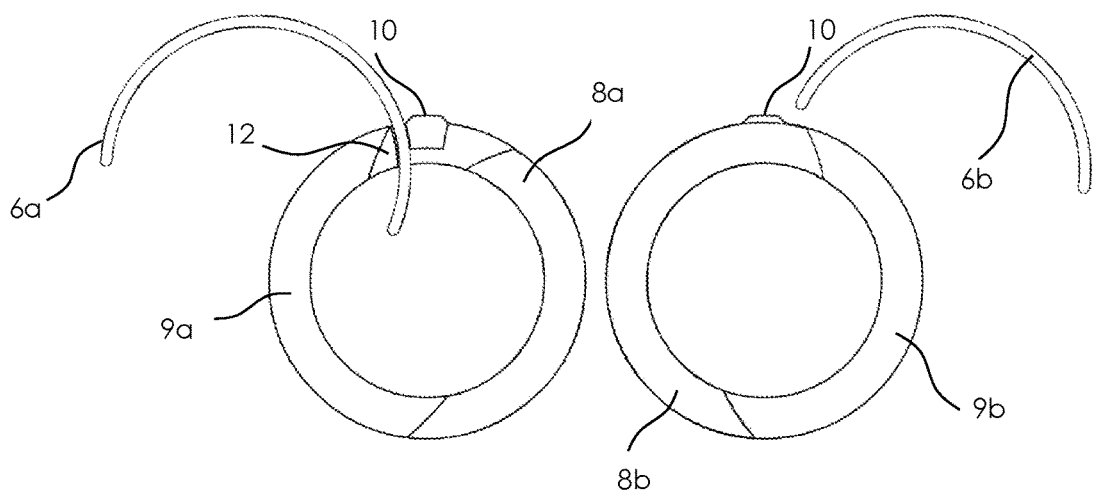

FIG. 4d shows a further working step which follows the working step shown in FIG. 4c. The shut-off slide valve 6b has now fully opened the compression cylinder 9b, and the compression piston 8b closes the passage 10. In this position, a fuel added to the compressed gas can be ignited, and hence the mixture heated and the pressure increased. Because of the closed position of the shut-off slide valve 6a in the working cylinder 9a, and the closure of the passage 10 by the compression piston 8b, the resulting pressure can only escape in the direction of the working piston 8a and thereby yield its energy in targeted fashion. In practice, the direct injection or ignition may even take place shortly before the passage has been completely closed by the compression piston, since the ignition itself also takes time, and because of its inertia, the piston easily resists negligible initial forces.

Figure 4E:
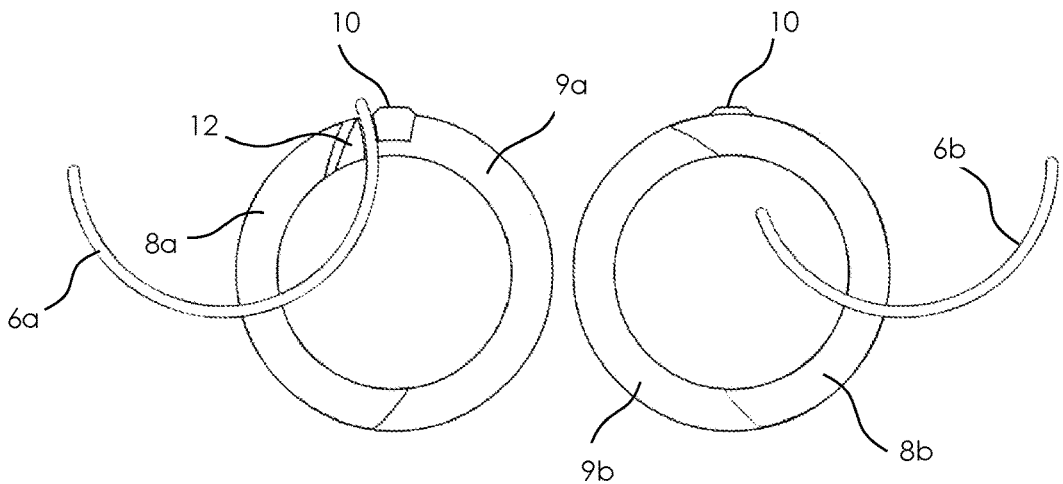

FIG. 4e shows a further working step which follows the working step shown in FIG. 4d. Expansion of the compressed and heated gas is now almost complete, and after the remaining gas from the preceding cycle has been expelled through the outlet opening 12 and the shut-off slide valve 6a has reopened the working cylinder 9a, the working piston 8a can close the passage 10 so that pressure can build up in the compression cylinder 9b again, as in the working step of FIG. 4a.

FIGS. 5a-5e show schematically the various working steps of the internal combustion engine 1a from FIG. 1 in top view onto a detail region of the passage 10. The illustrations may be regarded as a developed view of the rotary pistons 8a, 8b, wherein the illustrations are not formed correspondingly to FIG. 1 but inverted in a mirror image about a horizontal axis in the drawing plane.

Figure 5A:
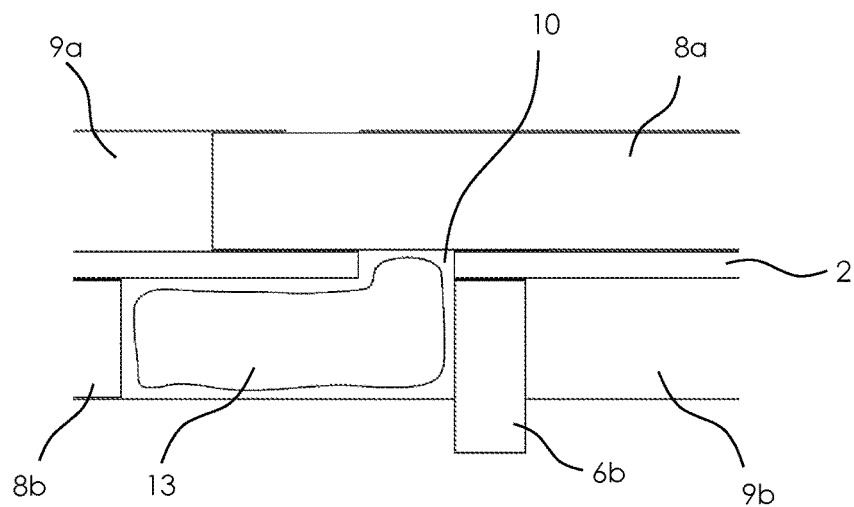
FIG. 5*a*-5*e* various working steps of the internal combustion engine from FIG. 1 in top view onto a detail area.

The working step shown in FIG. 5a substantially corresponds to the working step shown in FIG. 4b, in which the passage is closed by the working piston 8a. Because the shut-off slide valve 6b protrudes into the compression cylinder 9b and closes this shortly behind the passage 10 in the rotational direction of the compression piston 8b, the compression piston 8b can press the gas mixture present in the compression cylinder 9b in the direction of the passage 10 and compress it.

Figure 5B:
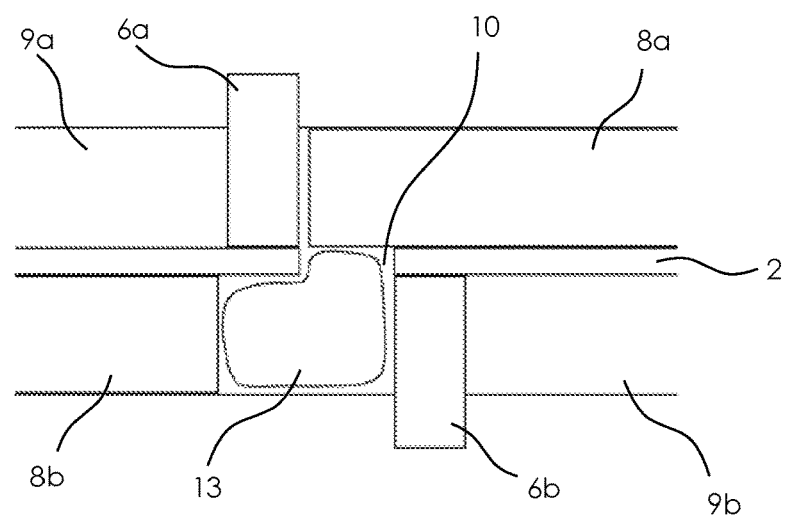

As evident from FIG. 5b, the shut-off slide valve 6a closes the working cylinder 9a immediately behind the working piston 8a, so that the gas mixture can only escape into the working cylinder 9a in the direction of the working piston 8a.

Figure 5C:
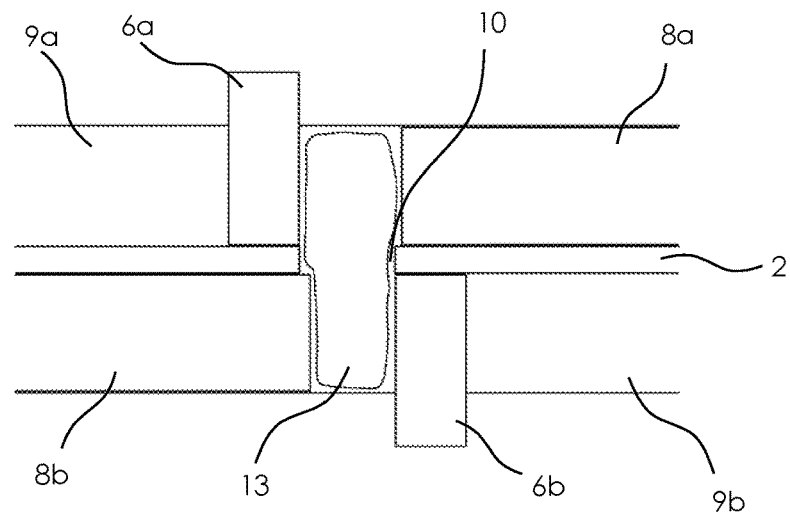

FIG. 5c shows how the compression piston 8b presses the gas mixture from the compression cylinder 9b into the working cylinder 9a. This working step substantially corresponds to the working step shown in FIG. 4c.

Figure 5D:
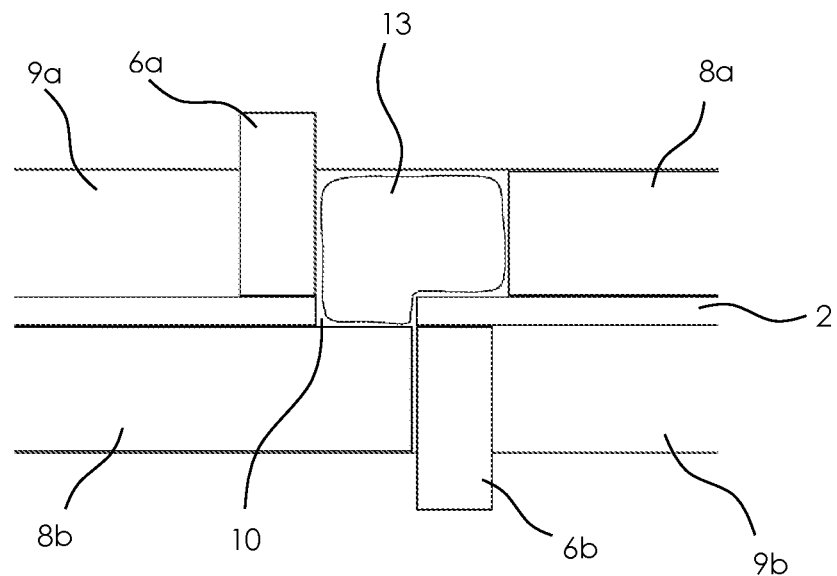

In FIG. 5d, the compression piston 8b has completely pressed the gas mixture 13 into the passage 10 and the working cylinder 9a. Also, the compression piston 8b closes the passage 10 and lies in a sealing fashion against the shut-off slide valve 6b. On a further movement of the compression piston 8b, the shut-off slide valve 6b is withdrawn from the compression cylinder 9b and thus opens this so that the compression piston 8b can pass unhindered.

Figure 5E:
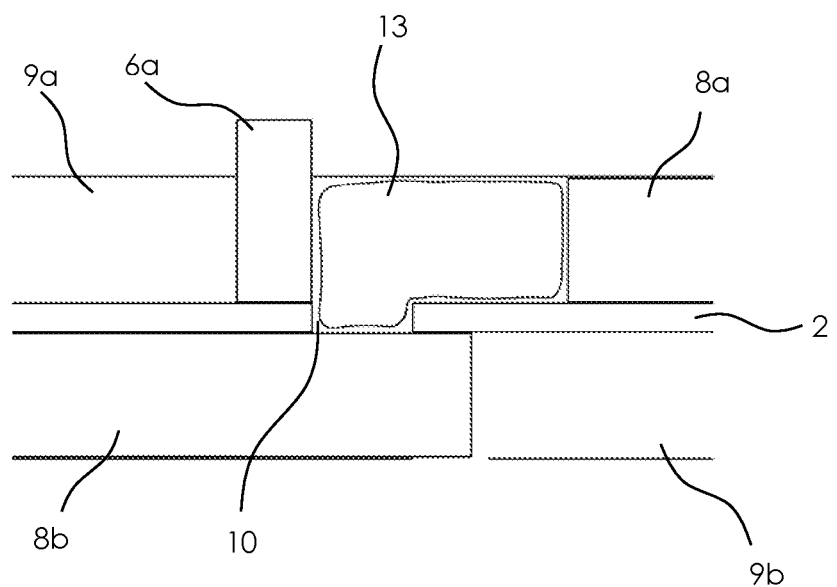

The working step shown in FIG. 5e substantially corresponds to the working step shown in FIGS. 4d and 4e. The gas mixture 13, heated by ignition or auto-ignition, here transfers its energy to the working piston 8a. Because the passage is closed by the compression piston 8b and the working cylinder 9a is blocked by the shut-off slide valve 6a, the gas mixture cannot escape. In alternative embodiments, ignition or auto-ignition of the gas mixture 13 may indeed take place already while the working piston 8a has not yet opened the passage 10, but because of the pressure peaks to be expected in some cases, it is however advantageous if the ignition/auto-ignition takes place only when the passage 10 has been opened by the working piston 8a.

Figure 6:
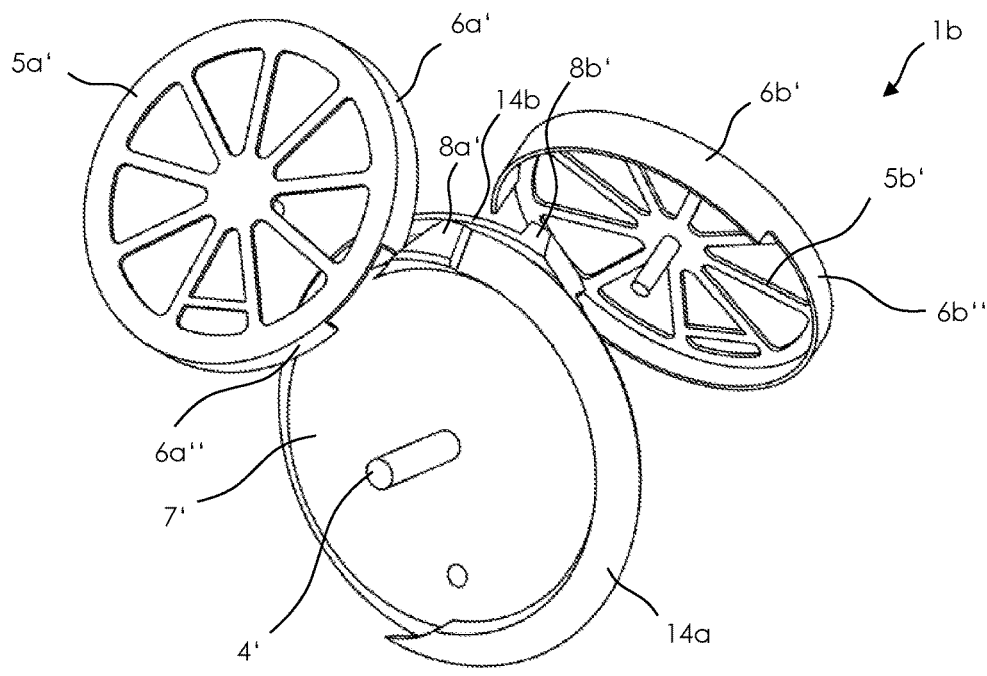
FIG. 6 a detail view of an alternative embodiment of an internal combustion engine.

FIG. 6 shows a detail view of an alternative embodiment of an internal combustion engine 1b. Parts identical to those of the embodiment in FIGS. 1-5 carry the same reference signs, wherein for distinction, an apostrophe has been added. As evident from the comparison with the first embodiment shown in FIG. 3, the embodiment shown in FIG. 6 differs in particular in that the compression piston 8b' here has a cross-section which reduces against the rotational direction, and the working piston 8a' has a cross-section which reduces in the rotational direction. This is achieved in that a shoulder 14a, 14b is provided on each of the compression piston 8b' and the working piston 8a', at which shoulder the cross-section of the working piston 8a' and compression piston 8b' is reduced to a constant dimension relative to an end region which—if an overlap region of the working piston 8a' and compression piston 8b' is provided—preferably lies in the overlap region. Correspondingly, an additional shut-off slide valve 6a" or 6b" is arranged on the respective valve disc 5a' or 5b' and lies against the shut-off slide valve 6a' or 6b' on one side. The additional shut-off slide valves 6a" and 6b" are configured to lie in a sealing fashion against the respective shoulders 14a, 14b and allow a particularly efficient operation of the internal combustion engine 1b, as will be shown with reference to the following figures. In contrast to the illustration in FIG. 6, the step of the shoulder 14a, 14b to the end region may be curved correspondingly to the end faces of the rotary pistons, so as to achieve an optimum seal against the shut-off slide valves.

FIGS. 7a-7g show schematically various working steps of the internal combustion engine 1b of FIG. 6 in top view onto a detail region of the passage 10', wherein the illustration is not formed correspondingly to FIG. 6 but, for a depiction comparable to FIGS. 5a-5e, is inverted in a mirror image about a horizontal axis in the drawing plane. In contrast to the illustration in FIGS. 5a-5e, here in addition to the intermediate wall of the housing 2 between the annular cylinders 9a', 9b', the outer wall of the housing 2 is also shown with the inlet opening 11' and outlet opening 12'. As evident from a comparison with the first embodiment shown in FIG. 5a, this first working step differs inter alia in that the shut-off slide valve 6a", which does not protrude as far into the working cylinder 9a' as the shut-off slide valve 6a, lies in a sealing fashion against the shoulder 14a. The working piston 8a' is on the left of the outlet opening 12', so that on a movement of the working piston 8a', the gas mixture from a preceding cycle can be expelled through the outlet opening 12'. Otherwise, the function of this working step is identical to that of the illustration of FIG. 5a. The shut-off slide valve 6b' closes the compression cylinder 9b' behind the passage 10' in the rotational direction of the compression piston 8b', and also the working piston 8a' closes the passage 10', so that the enclosed gas or gas mixture can be compressed by the compression piston 8b'.

Figure 7A:
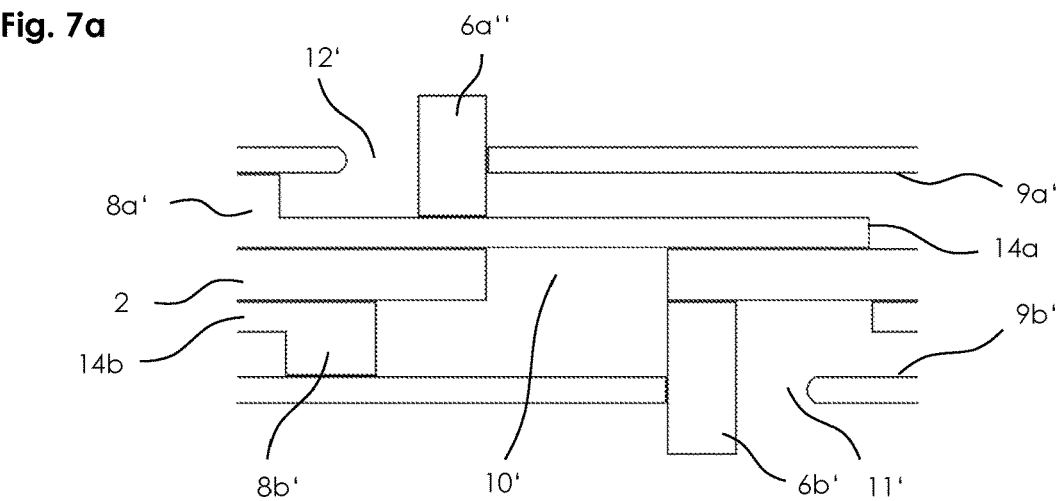
FIG. 7*a*-7*g* various working steps of the internal combustion engine from FIG. 6 in top view onto a detail area.
Figure 7B:
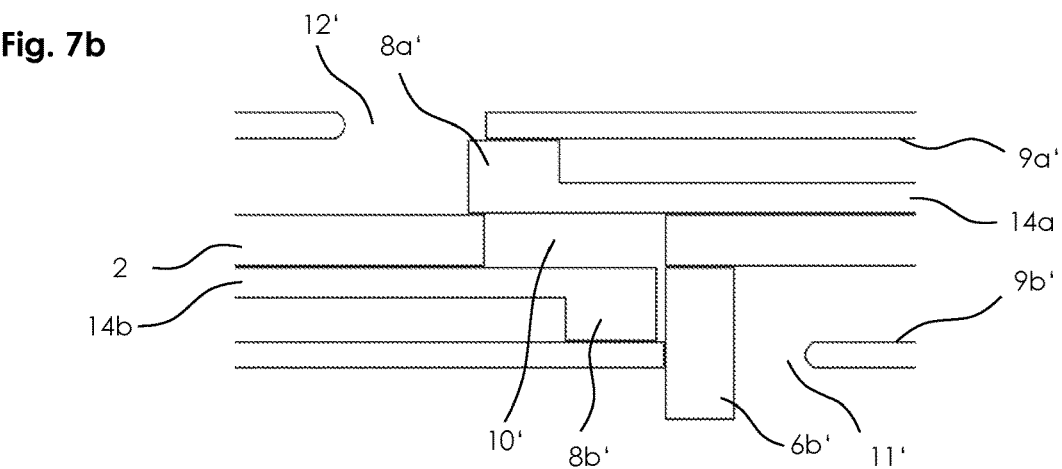

FIG. 7b shows a further working step which follows the working step shown in FIG. 7a. As evident from a comparison with the illustration in FIG. 5b, in this embodiment, the compression piston 8b' and the working piston 8a' overlap in a portion in the circumferential direction in which the pistons at least partially have no cross-sectional reduction. The overlap extends in the circumferential direction so far that the passage 10' is closed equally by the compression piston 8b' and the working piston 8a'. Alternatively however, only a smaller overlap or no overlap may be provided between the compression piston 8b' and the working piston 8a' in the respective portion of the pistons in the circumferential direction in which the pistons at least partially have no cross-sectional reduction. As further evident from the illustration, the compression piston 8b' is just about to lie against the shut-off slide valve 6b', which at present still closes the compression cylinder 9b'.

Figure 7C:
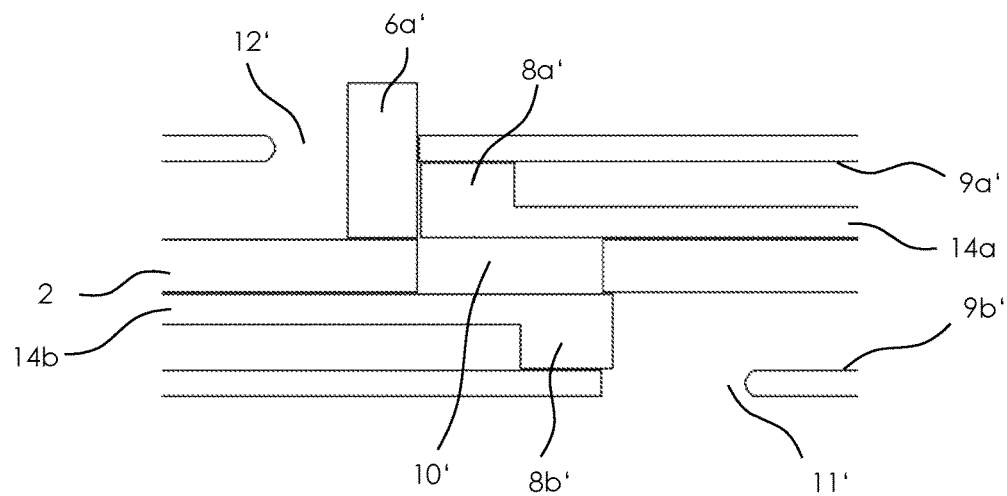

FIG. 7c shows a further working step which follows the working step shown in FIG. 7b. Here now, the shut-off slide valve 6b' is remote from the compression cylinder 9b' so that the compression piston 8b' can move further without hindrance. Now the shut-off slide valve 6a' protrudes into the working cylinder 9a', and in contrast to the shut-off slide valve 6a" reaches up to the intermediate wall of the housing 2 and thus closes the working cylinder 9a'. As also described with reference to FIG. 5e, the gas mixture may indeed be ignited in this position, but because of the almost complete closure of the passage 10' by the working piston 8a', a high peak pressure would be created, so the ignition/auto-ignition preferably first takes place in the position shown in FIG. 7d.

Alternatively, the end regions without cross-sectional reduction could also be formed longer, so that ignition may take place already in the position shown in FIG. 7c, in particular if the passage is closed by both pistons. The length of the passage in the rotational direction may be shorter, and/or the cross-section of the passage may be smaller, so that the surface area of the pistons 8a', 8b' on which the pressure acts is greatly reduced. Here, alternatively a combination of the embodiments from FIG. 5 and FIGS. 6 and 7 may be suitable. Alternatively or additionally, it may be provided that the passage has a cross-section which enlarges in the direction of the working cylinder 9a', so that the pressure in the passage acts on a smaller surface area of the compression piston 8b'.

Figure 7D:
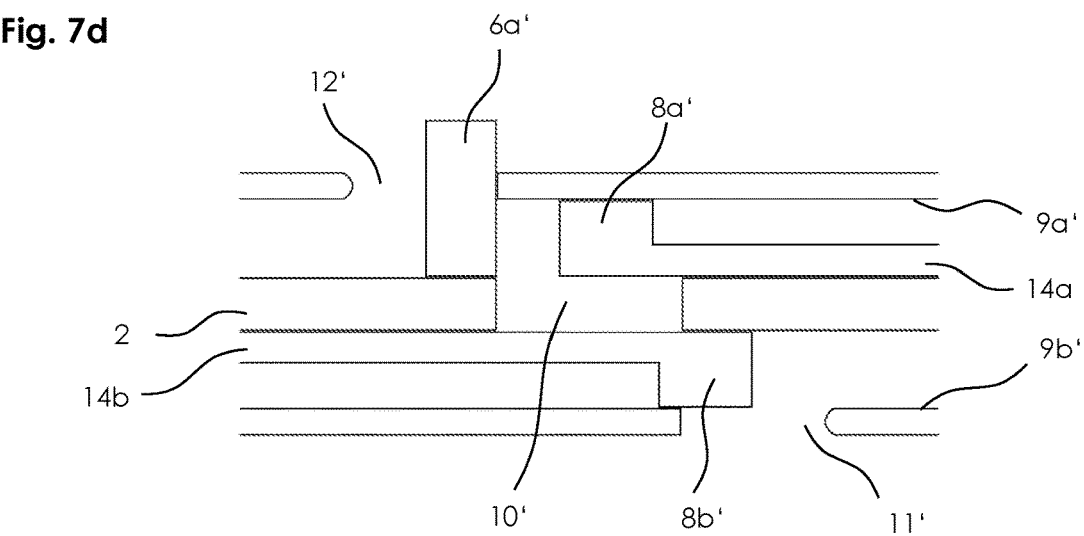

FIG. 7d shows a further working step which follows the working step shown in FIG. 7c. As evident there, the working piston 8a' has opened the passage 10' so that now the compressed—and in some cases heated—gas mixture can escape into the working cylinder 9a' and load the working piston 8a' in the rotational direction. Closure of the passage 10' by the compression piston 8b' and closure of the working cylinder 9a' by the shut-off slide valve 6a' prevents an unintentional escape of the gas mixture.

Figure 7E:
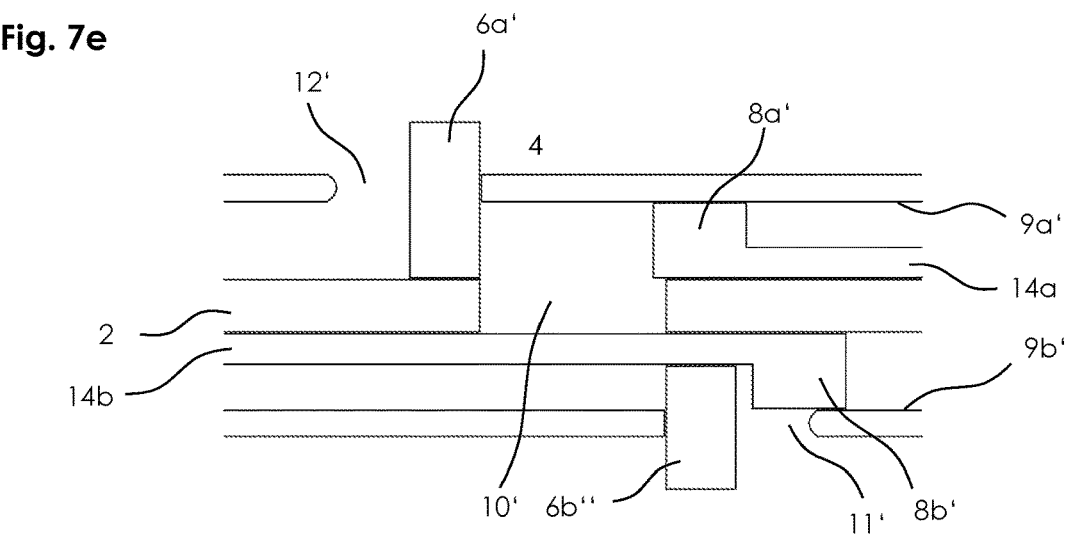

FIG. 7e shows a further working step which follows the working step shown in FIG. 7d. The working piston 8a' is moved further to the right by the expansion of the gas mixture. In the compression cylinder 9b', the compression piston 8b' still closes the passage 10', wherein however on the opposite side, the shut-off slide valve 6b" protrudes into the compression cylinder 9b' and lies in a sealing fashion against the shoulder 14b of the compression piston 8b'. Thus, already in this working step, fresh gas may be drawn into the compression cylinder 9b', as shown in particular in the following working step in FIG. 7f.

Figure 7F:
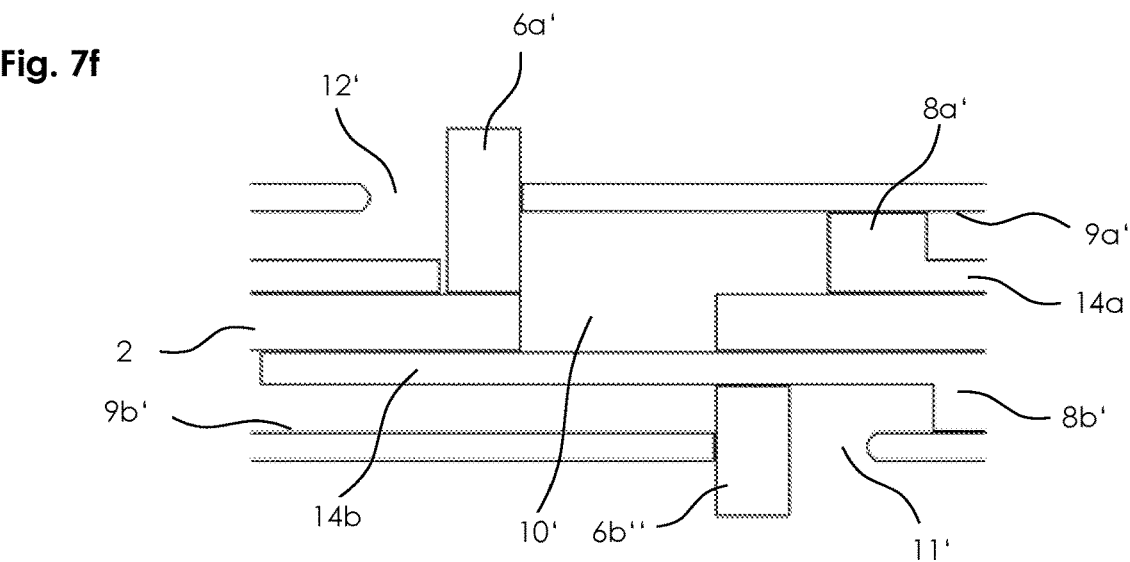
Figure 7G:
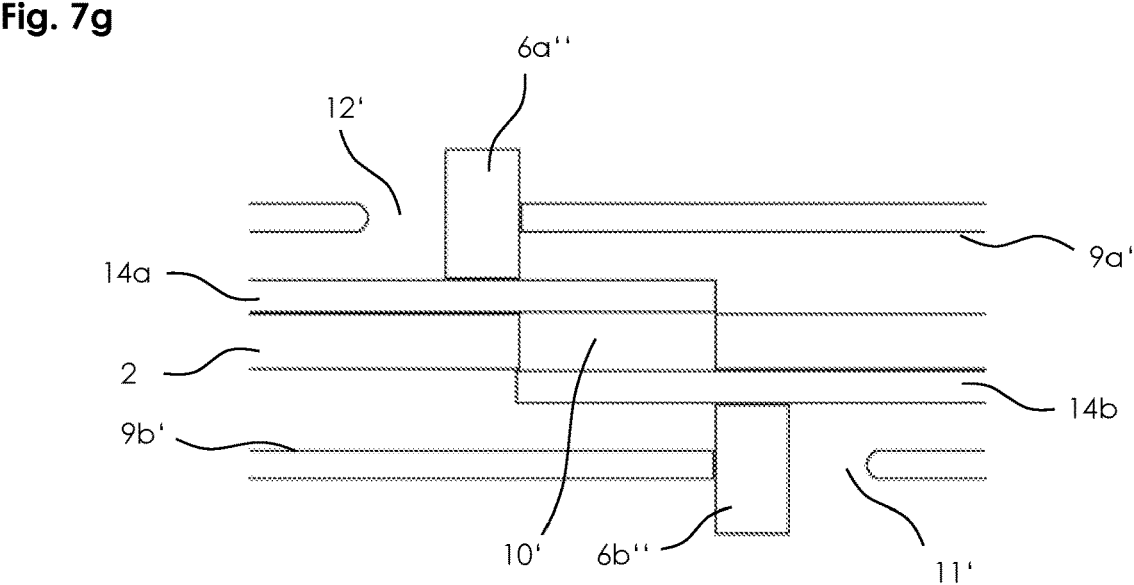

FIG. 7g shows a further working step which follows the working step shown in FIG. 7f. As evident there, the shoulders 14a, 14b overlap over a length which is greater than or equal to the extent of the passage 10' in the rotational direction of the shoulders 14a, 14b. Thus a flow of fresh gas through the passage 10' is prevented in the early phase of compression. Then the cycle is repeated with the working step shown in FIG. 7a.

Figure 8:
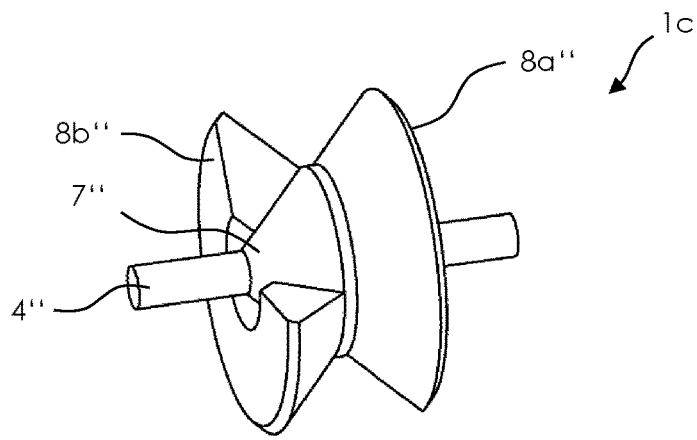
FIG. 8 a perspective, detail view of a further alternative embodiment of an internal combustion engine.

FIG. 8 shows a perspective detail view of a further alternative embodiment of the internal combustion engine 1c, wherein the housing and the valve discs are not shown. In contrast to the embodiments presented above, in this embodiment the piston disc 7" with the rotary pistons 8a", 8b" is formed particularly compactly, wherein the ratio of piston surface area to total compression volume is particularly high. The piston disc 7" may here be described as a double cone consisting of two straight circular cones, the tips of which point away from one another. A rotary piston 8a" or 8b" is arranged on the casing surface of each circular cone.

In more compact embodiments such as that shown, sloping and/or angled valve discs (with shut-off slide valves) may be provided. Furthermore, it may help to constrict the housing and hence the piston form inwardly in the horizontal direction so that they protrude less at the side. This ensures that the housing does not cross the shut-off slide valves a second time. The more space or distance the valve discs/shut-off slide valves have from the housing at all points outside the desired interface with the annular cylinders, the more the inner radius of the rotary pistons can be reduced.

Advantageously, the rotary piston extends in the radial direction over a region of at least 50%, advantageously at least 70% and particularly advantageously at least 80% relative to the maximum radius of the rotary piston measured from the axis of the output shaft.

The embodiment shown in FIG. 8 has the advantage that, in comparison with previous versions, more pressure may bear on the end face of the working piston relative to the total volume, and hence a particularly high torque is possible in comparison with the available compression volume, which in turn allows degrees of freedom in optimization. In addition, significantly less sealing is required against the output shaft 4", and fewer surfaces rub on one another at the shaft. For further features, reference is made to the description of the preceding embodiments, the function of which is otherwise identical. In particular, reference is made to the possibility of configuring the piston fronts and piston rears so as to be acute/steep, so that these can lie in a sealing fashion against the shut-off slide valves, and to the possibility of the stepped or stepless cross-sectional change at the front and/or rear of the rotary pistons, which is also applicable in the compact embodiment shown in FIG. 8.

Figure 9:
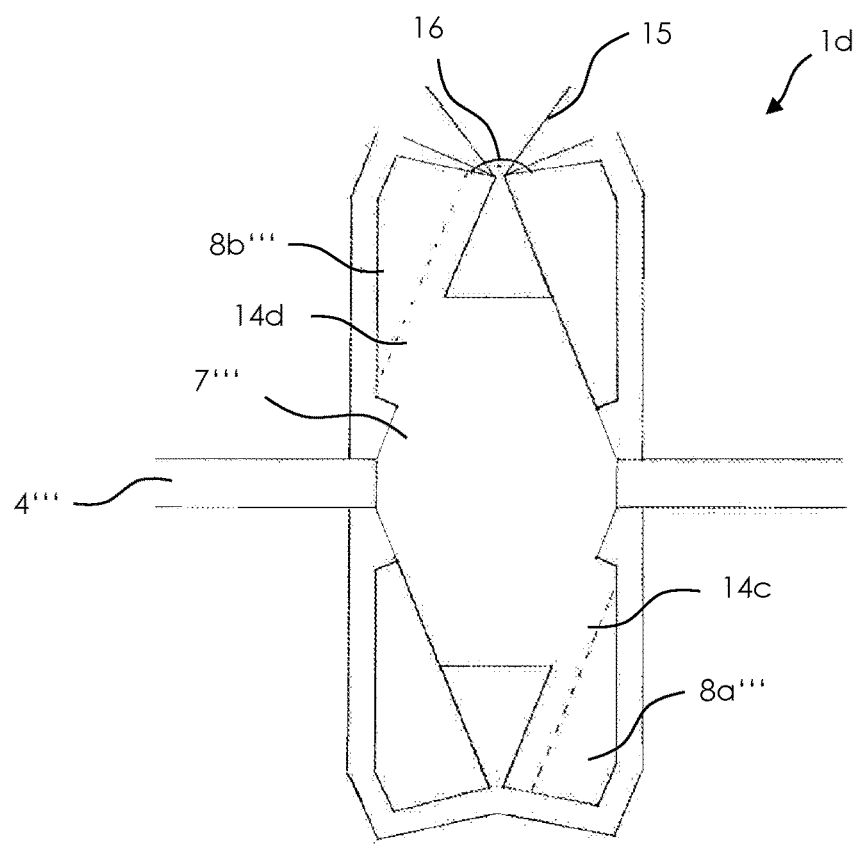
FIG. 9 a cross-section through a further alternative embodiment of an internal combustion engine.

Such an embodiment of an internal combustion engine arises from the cross-sectional illustration shown in FIG. 9. In contrast to the embodiment in FIG. 8, the internal combustion engine 1d comprises rotary pistons 8a"", 8b'" with shoulders 14c, 14d which, with the exception of other proportions, may be designed correspondingly to those of the embodiment in FIG. 6. As indicated by the various slope angles 15, the rotary pistons 8a"", 8b'" may slope towards one another at their radial end faces, in particular enclose an intermediate angle 16 of more than 160°, and particularly advantageously more than 180°. If the intermediate angle is smaller, there is more cylinder volume. If the intermediate angle is however larger, a flow dynamic effect is achieved in which on compression, air is moved from further outside in the cylinder towards the inside in the direction of the passage when the shut-off slide valve lies thereon.

Figure 10:
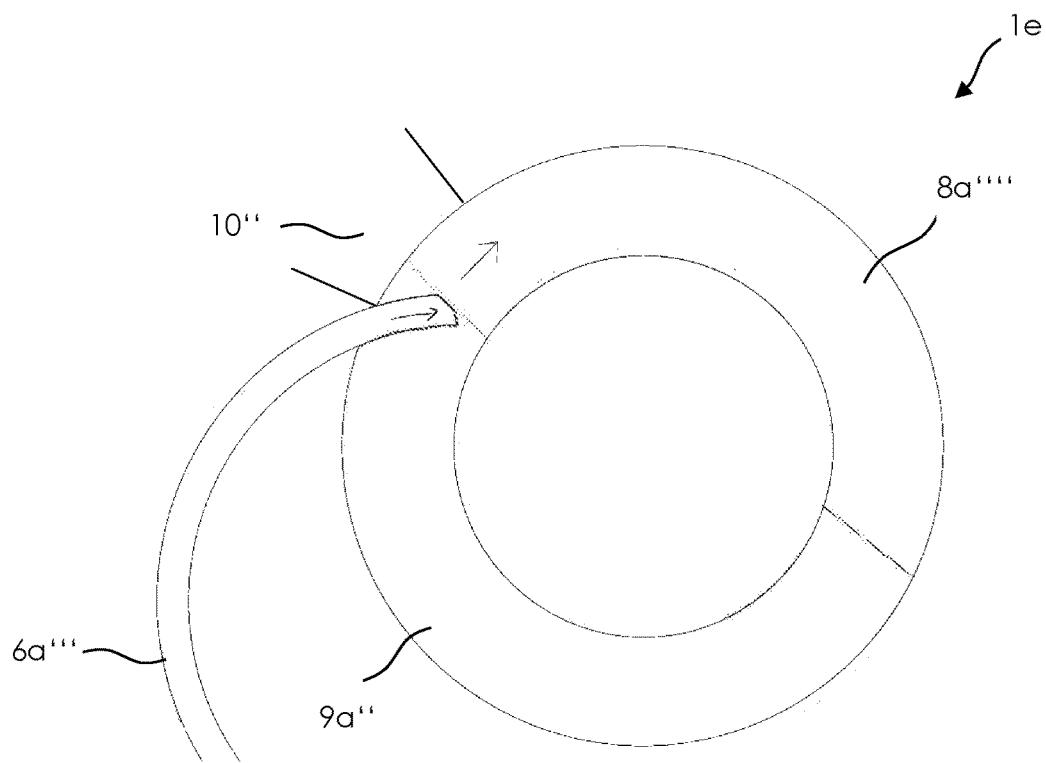
FIG. 10 a schematic side view of a further alternative embodiment of an internal combustion engine.

FIG. 10 shows a schematic side view of a further alternative embodiment of an internal combustion engine 1e. In contrast to the embodiment shown in FIGS. 4a-4e, the angle between the movement directions (indicated by arrows) of the rotary piston 8a"" and the shut-off slide valve 6a'" at the intersection of the two circular tracks in the annular cylinder 9a" is significantly smaller and preferably lies between 40° and 80°. In comparison for example with the embodiment in FIG. 6, the piston ends may be flatter so that, as a result of the compression pressure or expansion pressure, only a correspondingly smaller radial force proportion is introduced into the bearing of the rotary piston where it must be supported.

Figure 11:
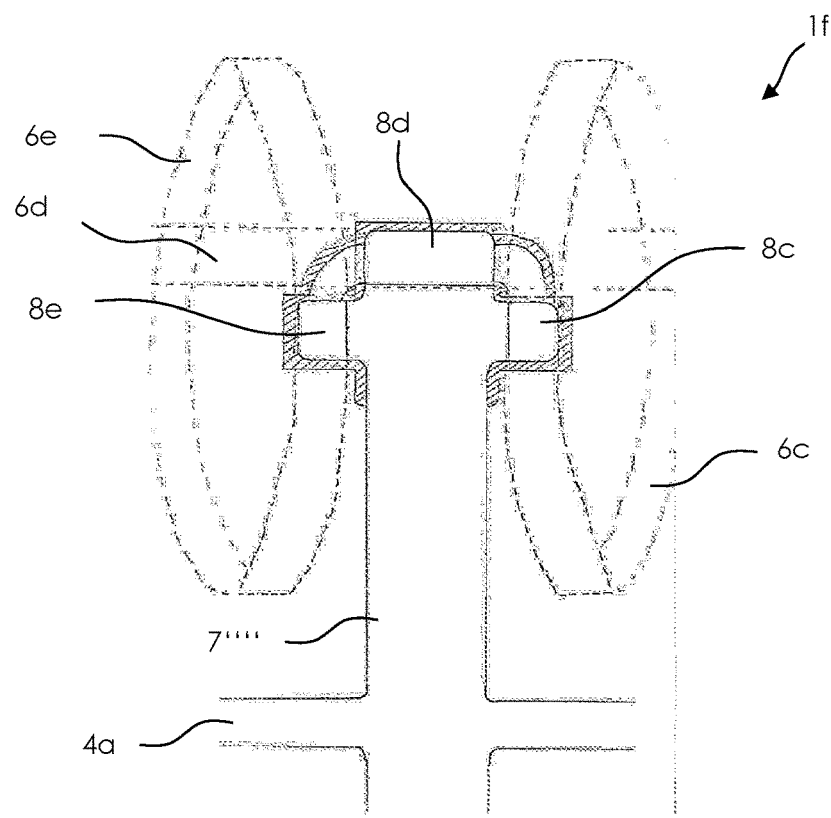
FIG. 11, 12 cross-sections through further alternative embodiments of an internal combustion engine.
Figure 12:
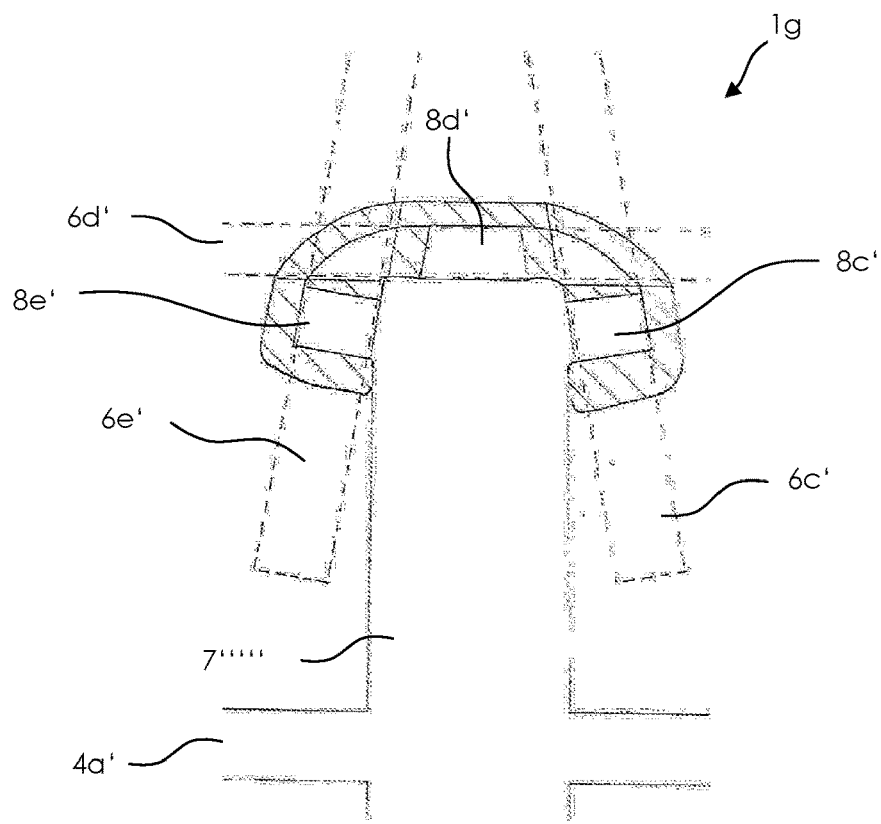

As an alternative to the shown embodiments, an internal combustion engine 1f, 1g may also, as shown in FIGS. 11 and 12, comprise three rotary pistons 8c, 8c', 8d, 8d', 8e, 8e' and hence three cylinders, wherein for example two rotary pistons 8c, 8c', 8e, 8e' adjoin the piston disc 7"", 7"" at the side and a third rotary piston 8d, 8d' adjoins the piston disc in the radial direction and is arranged between the other rotary pistons. The middle rotary piston may, as shown, be connected rotationally fixedly, in particular integrally, to one or both of the outer rotary pistons. The outer rotary pistons may be arranged on the same piston disc or on different piston discs and, as in the embodiments described above, may be configured as compression pistons or working pistons.

Preferably, the outer pistons always have the same function, i.e. both are compression pistons with centrally arranged working piston, or working pistons with centrally arranged compression piston. The cylinders of the three rotary pistons may all have different cross-sections. The outer cylinders are connected to the middle cylinder via at least one passage. A shut-off slide valve 6d, 6d' may be provided for the cylinder of the middle rotary piston, which valve has a movement component parallel to the axis of the output shaft(s) 4a, 4a', i.e. a horizontal movement from right to left or vice versa in an illustration comparable to that of the embodiment in FIG. 12. In this case, several combustion chambers or passages spaced apart in the circumferential direction may be provided, in particular in numbers of a multiple of two, and the positions of the side rotary pistons 8c, 8c', 8e, 8e' and hence the positions of the shut-off slide valves 6c, 6c', 6e, 6e' may be arranged asymmetrically in order to compensate for the movement of the upper shut-off slide valve.

As already described, the three rotary pistons need not be attached to a single piston disc. As long as synchronization is guaranteed by a connection via gearwheels, belts etc., the rotational axes of the pistons may also stand at an angle to one another which deviates substantially from 0°.

Figure 13:
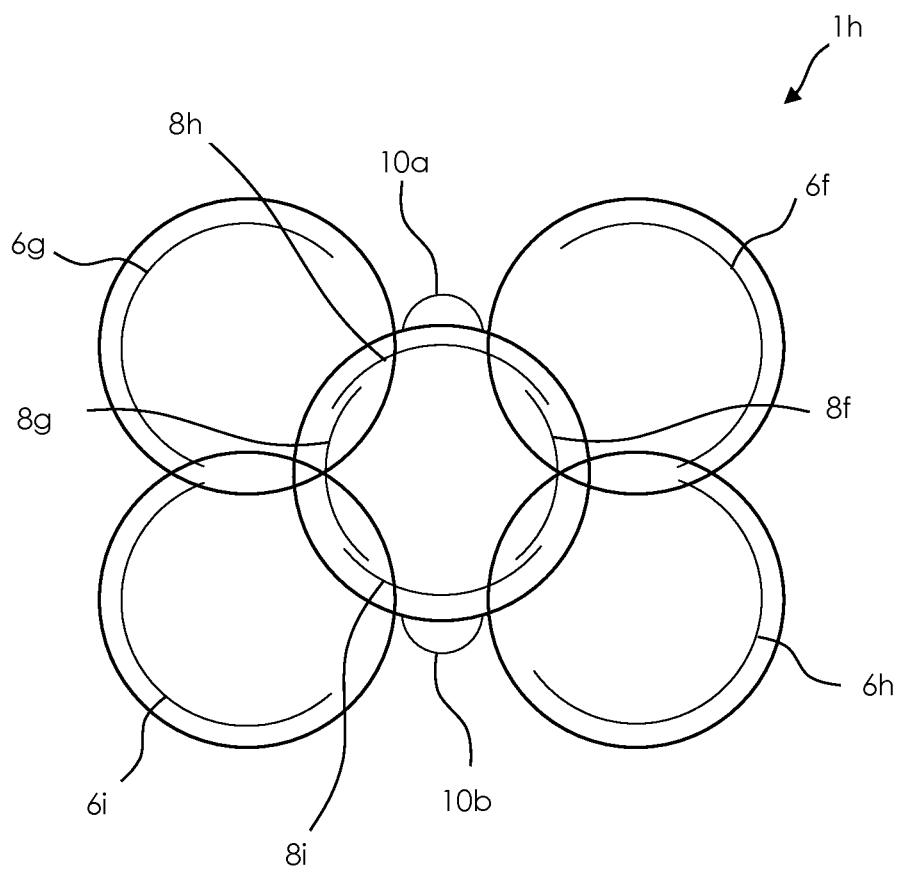
FIG. 13 a schematic side view of an embodiment of an internal combustion engine with two combustion chambers.

FIG. 13 shows schematically a side view of an embodiment of an internal combustion engine 1h which has two passages 10a, 10b and two combustion chambers arranged in the passages 10a, 10b. In contrast to the embodiment presented above, in the combustion engine 1h, two rotary pistons are arranged, offset preferably by 180° in the circumferential direction, in each of the two annular cylinders (not shown here). For example, the rotary pistons 8f, 8g are configured as compression pistons and the rotary pistons 8h, 8i as working pistons. Also, two shut-off slide valves 6f, 6i or 6g, 6h respectively on different valve discs are assigned to each of the two annular cylinders. The configuration consequently corresponds to the embodiment shown in FIG. 3, wherein at the bottom additional shut-off slide valves and a passage are provided in a mirror image to the configuration at the top, and two rotary pistons extend on each side of the piston disc, each over a shorter length in the circumferential direction. In the embodiment shown, the shut-off slide valves rotate with double the rotational speed of the rotary pistons. If more shut-off slide valves are provided on each valve disc, this ratio changes. In the case of two shut-off slide valves per valve disc, the rotational speeds of the shut-off slide valves and the rotary pistons are identical; in the case of four shut-off slide valves per valve disc, the rotational speed of the shut-off slide valves is half that of the rotary pistons. The advantage of the embodiment shown in FIG. 13 is that the piston end faces need not be as oblique, and forces are more balanced by the symmetrical structure. The corresponding formula for the rotational speed ratio of the shut-off slide valves to the rotary pistons is as follows: number of pistons of the cylinder for which the valve disc concerned is responsible/number of shut-off slide valves of the valve disc concerned. The depiction in FIG. 13 is merely schematic and serves for illustration; the mutual positioning of the movable elements is not however synchronized accurately. A further advantage of an embodiment with two or more passages is that in this way, the ratio of stroke to piston cross-section can be set/adapted better.

The individual features described with reference to various embodiments may easily be combined. Thus for example, both at least one compact rotary piston as shown in FIG. 8 and also at least one rotary piston as shown in FIG. 1 or 6 may be arranged on one piston disc. A shoulder corresponding to that of the exemplary embodiment in FIG. 6 may also be provided on only some of the rotary pistons, i.e. on one rotary piston out of a total of two rotary pistons, or on one or two rotary pistons out of a total of three rotary pistons. Quite generally, rotary pistons with different diameters may also be provided on one piston disc.

FIGS. 14*a* to 14*d* show various possible positions of a valve disc relative to a piston disc. Since these are fundamentally structural variations, which for example are not restricted to valve discs of a specific compression cylinder or working cylinder, general reference signs are used for the piston disc 7 with rotary pistons 8, the output shaft 4, the valve disc 5 and the shut-off slide valves 6.

Figure 14A:
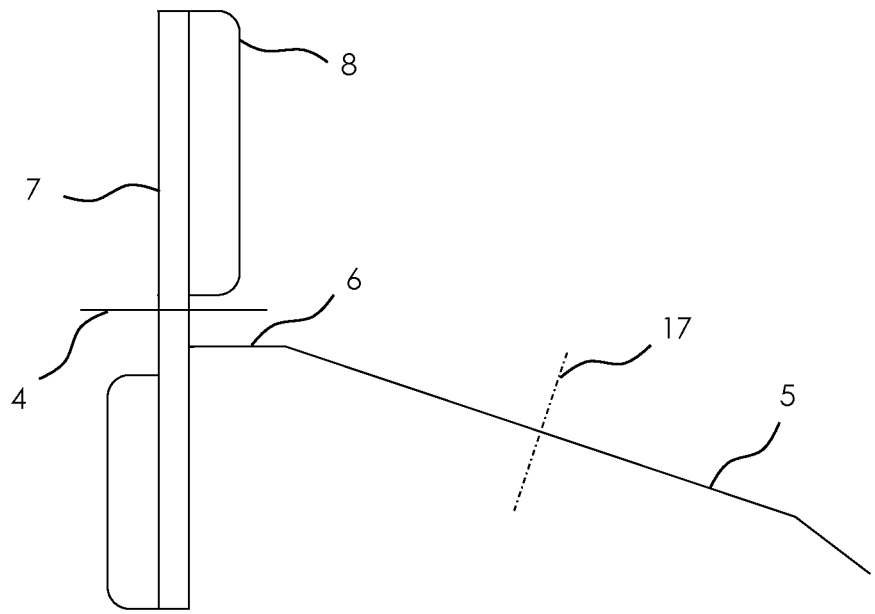
FIG. 14*a-d*: various possible positions of a valve disc relative to a piston disc.
Figure 14B:
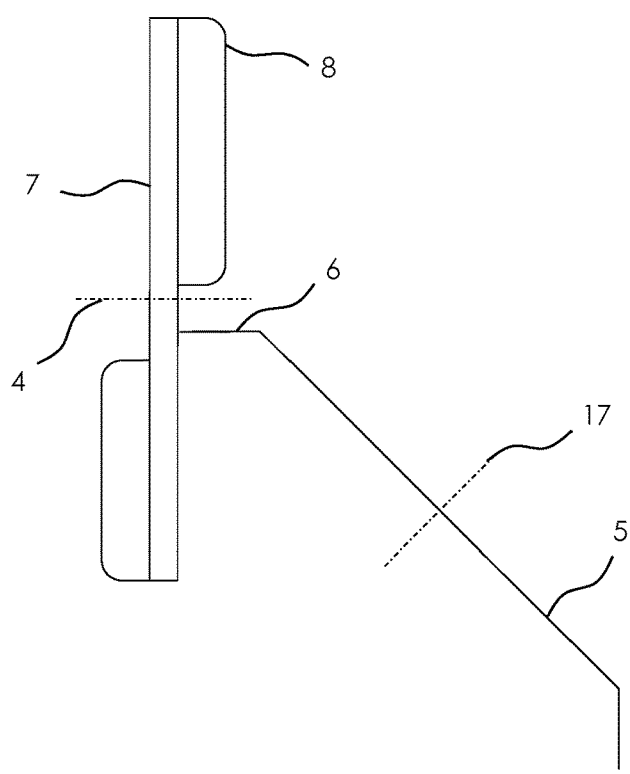
Figure 14C:
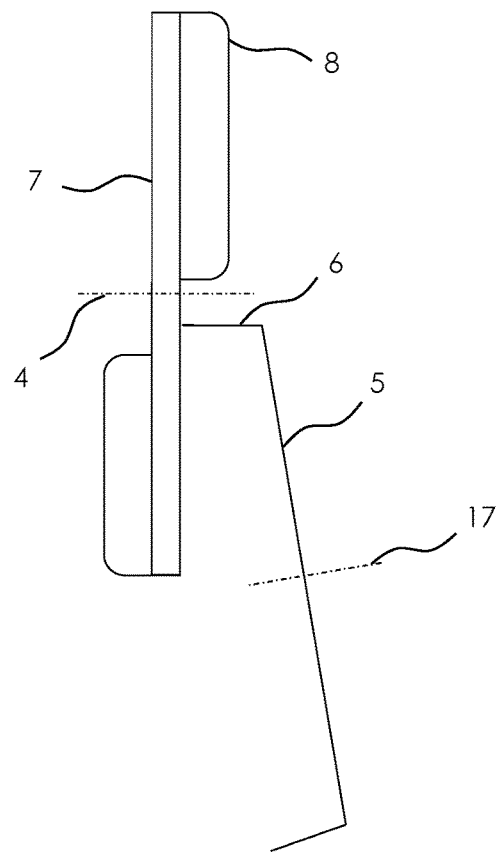
Figure 14D:
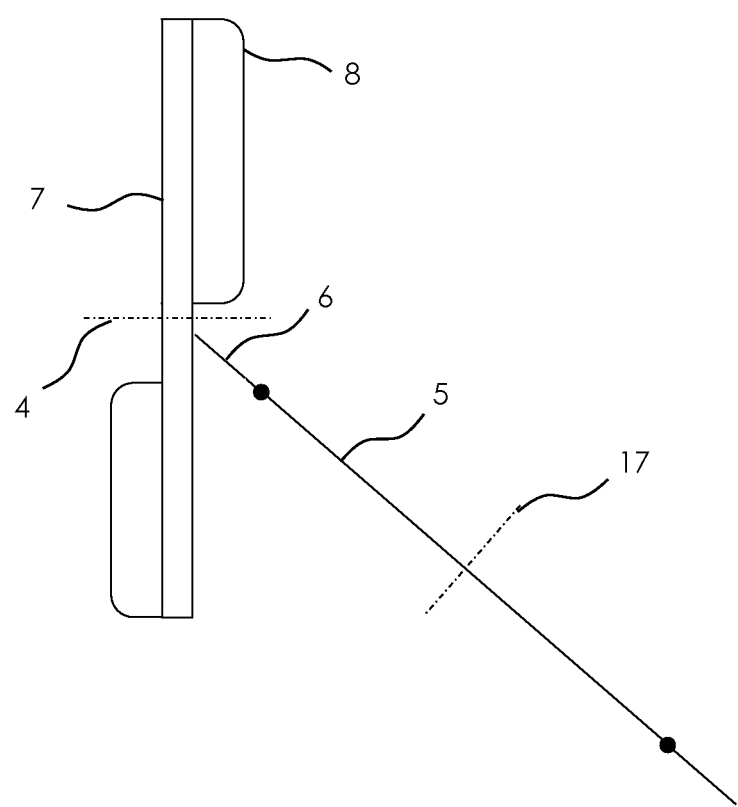

As evident from the schematic sectional illustrations, with this type of slope (which is the first slope type described below), the rotational axis 17 of the valve disc 5 may assume various angles, preferably deviating from 90°, to the axis of the output shaft 4. With a flat design of valve disc 5, the angle between the plane of the valve disc 5 and the axis of the output shaft 4 may for example be greater than or equal to 10°. Preferably, the angle is greater than or equal to 40°, particularly preferably greater than or equal to 60°. For a non-flat valve disc, for example a dish-shaped valve disc, this corresponds to an angle between the axis of the output shaft and the axis of the valve disc which is less than or equal to 80°, preferably less than or equal to 50°, and particularly preferably less than or equal to 30°. Preferably however, as shown in FIGS. 14*a* to 14*c*, it is provided that the shut-off slide valve 6 is oriented parallel to the axis of the output shaft 4 at the point where it crosses the cylinder of the piston 8. To achieve this, the shut-off slide valve 6 may protrude from the plane of the valve disc 5 with an intermediate angle which lies between 90° and 0°. Irrespective of the positioning of the valve disc 5 relative to the piston disc 7, the shut-off slide valve 6 may protrude from the valve disc 5 for example at an angle of at least 45°, preferably at least 60° and particularly preferably at least 80° or equal to 90°. For a non-flat valve disc, this corresponds to an angle between the shut-off slide valve and the axis of the valve disc which is less than or equal to 45°, preferably less than or equal to 30°, and particularly preferably less than or equal to 10°. Alternatively, as shown in FIG. 14*d*, the shut-off slide valve 6 may also be arranged in the plane of the valve disc 5.

The possible positions described in FIGS. 14*a* to 14*d* are applicable for all embodiments described above. Also, in one embodiment, one valve disc may have a different positioning/different intermediate angle to the piston disc than a further valve disc, whereby in particular a structural adaptation to the different pressures in the compression and working cylinders is possible.

Alternatively, shut-off slide valves may also be provided which, in a sectional illustration corresponding to FIGS. 14*a* to 14*d*, have a course with a single or multiple curvature and/or an angular course. In these embodiments, there is no single angle to the valve disc. As in the embodiments in FIGS. 14*a* to 14*c* however, the shut-off slide valves protrude relative to the valve disc in the direction of the axis of the valve disc.

One, several or all valve discs may also slope with a second slope type. According to the first slope type, the valve disc or mutually parallel planes inside which the valve disc and its shut-off slide valves rotate, may slope at a tangent to the valve disc in the region of the overlap of the shut-off slide valves with the piston track/cylinder or adjacent thereto. The tangent may preferably be situated only in the approximate region of the shut-off slide valves or valve disc edge, and is not restricted to the outermost edge. The tangent furthermore advantageously stands parallel to the plane or planes of the valve disc and perpendicular to a radius from the valve disc axis. The first slope type is therefore that at which the valve disc and shut-off slide valve(s) slope at their tangent in the region of the interface with the respective cylinder/piston track.

The first slope type can be measured at the angle between the straight line which runs through the region of the interface with the cylinder or the piston track concerned and perpendicularly through the axis (which may be imaginary at this point) of the valve disc, and the plane (or planes between which the pistons rotate and the axes of which intersect the planes perpendicularly) of the piston/piston tracks concerned.

The following angular data are defined for the case that the starting point (e.g. for the slope at the tangent) is when the above-described straight line is parallel to the described plane of the piston disc or the planes between which the pistons rotate. Said angle may preferably be less than or equal to 80°, advantageously less than or equal to 50° and particularly preferably less than or equal to 30°.

According to the second slope type, the valve disc slopes about an (imaginary) axis which runs through the region of the interface of the valve disc/shut-off slide valve with the piston track concerned, and through the valve disc axis, and intersects this perpendicularly (similarly to a radius). The second slope type is therefore that at which the valve disc and shut-off slide valve(s) slope about the straight line which runs through the region of the interface with the cylinder/piston track concerned and perpendicularly through the (possibly imaginary) axis of the valve disc (for flat and not dish-shaped valve discs, similarly to the depiction of the radius of the valve disc at the interface).

The second slope type can be measured at the angle between the tangent of the valve disc in the region of the valve disc-cylinder interface concerned and the plane (planes between which the pistons rotate and the axis of which intersects the planes perpendicularly) of the respective piston/piston tracks.

When the angle amounts to 0°, the planes and the tangent are parallel. Said angle may then preferably be greater than or equal to 5°, advantageously greater than or equal to 20°, and particularly preferably equal to 45°.

Whether only one or several slope types are present can be identified from whether or not the tangent and/or a straight line (radius) is planar/parallel to the piston track plane, so that in some cases a slope type is excluded.

If, instead of the above-mentioned radius, straight lines are assumed, these (for sloping of the valve discs in any case) intersect the plane(s) and the angle can be measured there.

The main purpose of the two slope types is that as a result, the shut-off slide valves only intersect the cylinders once and otherwise offer the cylinder as much space as possible. This leads to important degrees of freedom for the design/proportioning of the cylinders (cylinder cross-sections), which are significant for the engine function.

Because of the special orientation of the valve discs to the piston track, the forces of the gas pressure are advantageously directed onto the bearings. Also, the forces of the gas pressure are still partially distributed over the periphery of the shut-off slide valve and valve disc, which brings advantages for stability and consequently for weight.

The possible protrusion of the shut-off slide valves from the valve discs applies here just as in the first slope type. The two slope types may be combined and are applicable in all embodiments.

While specific embodiments of the invention have been shown and described in detail to illustrate the inventive principles, it will be understood that the invention may be embodied otherwise without departing from such principles.

I claim:

1. An internal combustion engine for producing mechanical drive power by combustion of a fuel, comprising:
    two rotary pistons which are rotationally fixedly connected to an output shaft and rotatably arranged in a respective annular cylinder; and
    a passage between the annular cylinders and a movable shut-off slide valve for each annular cylinder for periodically closing the cylinders adjacent to the passage, wherein the shut-off slide valves are arranged on rotatably mounted valve discs.

2. The internal combustion engine according to claim 1, wherein rotational axes of the valve discs are offset and/or at an angle to the rotary pistons so that upon a rotation of the valve discs, the shut-off slide valves periodically cross the cylinders and close the cylinders unilaterally or completely.

3. The internal combustion engine according to claim 1, wherein the rotary pistons are configured to slope towards one another in a radial direction.

4. The internal combustion engine according to claim 1, further comprising an additional valve or slider for closing the passage.

5. The internal combustion engine according to claim 1, wherein the passage between the cylinders is configured as a combustion chamber.

6. The internal combustion engine according to claim 5, wherein the combustion chamber has an ignition device for the fuel.

7. The internal combustion engine according to claim 1, wherein the rotary pistons have an angular or a rounded cross-section.

8. The internal combustion engine according to claim 7, wherein the rotary pistons have a rectangular or triangular cross-section.

9. The internal combustion engine according to claim 1, wherein a first of the rotary pistons is a compression piston in a compression cylinder, and a second of the rotary pistons is a working piston in a working cylinder, wherein the rotary pistons are arranged offset to one another in a rotational direction.

10. The internal combustion engine according to claim 9, wherein several shut-off slide valves of the compression cylinder and several shut-off slide valves of the working cylinder are arranged on a respective common valve disc.

11. The internal combustion engine according to claim 9, wherein the first rotary piston has a reducing cross-section against the rotational direction, and/or the second rotary piston has a reducing cross-section in the rotational direction.

12. The internal combustion engine according to claim 11, wherein, in each case, the reducing cross-section is stepless.

13. The internal combustion engine according to claim 11, wherein, in each case, the reducing cross-section is stepped.

\* \* \* \* \*